United States Patent
Yu et al.

(10) Patent No.: US 11,265,081 B2
(45) Date of Patent: Mar. 1, 2022

(54) METHOD, APPARATUS AND DEVICE FOR PREDICTING FAULT OF OPTICAL MODULE

(71) Applicant: Huawei Technologies Co., Ltd., Shenzhen (CN)

(72) Inventors: Fangfang Yu, Nanjing (CN); Feng Dong, Nanjing (CN); Wei Song, Nanjing (CN); Qingping Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/166,601

(22) Filed: Feb. 3, 2021

(65) Prior Publication Data

US 2021/0159973 A1     May 27, 2021

Related U.S. Application Data

(63) Continuation of application No. 16/750,611, filed on Jan. 23, 2020, now Pat. No. 10,944,473.

(30) Foreign Application Priority Data

Jan. 30, 2019    (CN) .......................... 201910093487.5

(51) Int. Cl.
| | |
|---|---|
| *H04B 10/079* | (2013.01) |
| *H04B 10/25* | (2013.01) |
| *H04B 10/60* | (2013.01) |
| *H04B 10/40* | (2013.01) |
| *H04B 10/50* | (2013.01) |

(52) U.S. Cl.
CPC ......... *H04B 10/0791* (2013.01); *H04B 10/25* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | |
|---|---|---|
| 2003/0113118 A1 | 6/2003 | Bartur |
| 2003/0152390 A1 | 8/2003 | Stewart et al. |
| 2004/0047635 A1* | 3/2004 | Aronson ................ H04B 10/40 398/138 |
| 2004/0088406 A1 | 5/2004 | Corley et al. |
| 2004/0197101 A1 | 10/2004 | Sasser et al. |
| 2009/0135761 A1 | 5/2009 | Khandekar et al. |
| 2009/0192735 A1 | 7/2009 | Horiuchi et al. |
| 2009/0269053 A1 | 10/2009 | Yang |

(Continued)

FOREIGN PATENT DOCUMENTS

| | | |
|---|---|---|
| CN | 103152095 B | 11/2015 |
| JP | 2016163106 A | 9/2016 |

*Primary Examiner* — Darren E Wolf
(74) *Attorney, Agent, or Firm* — Conley Rose, P.C.

(57) ABSTRACT

A method and an apparatus for predicting a fault of an optical circuit includes determining a classification threshold of an operating parameter based on a classification sample set corresponding to the operating parameter of optical circuit and predicting, based on comparison results between the classification threshold and a plurality of measured values in a sequence, whether a fault occurs in the future on the optical circuit corresponding to the sequence.

20 Claims, 5 Drawing Sheets

(56) References Cited

U.S. PATENT DOCUMENTS

2011/0311216 A1* 12/2011 Inoue .................. H04J 14/0213
                                                            398/1
2013/0209088 A1    8/2013  Rope et al.
2015/0243155 A1    8/2015  Xiong et al.
2016/0157075 A1    6/2016  Ho
2018/0054793 A1    2/2018  Renaldi et al.
2018/0063676 A1    3/2018  Myeek et al.

* cited by examiner

METHOD, APPARATUS AND DEVICE FOR PREDICTING FAULT OF OPTICAL MODULE

CROSS-REFERENCE TO RELATED APPLICATION

This application is a continuation of U.S. patent application Ser. No. 16/750,611 filed on Jan. 23, 2020, which claims priority to Chinese Patent Application No. 201910093487.5 filed on Jan. 30, 2019, both of which are hereby incorporated by reference in their entireties.

TECHNICAL FIELD

This application relates to the field of optical communications, and in particular, to a method, an apparatus and a device for predicting a fault of an optical module.

BACKGROUND

With development of optical communications technologies, optical modules are applied more widely to the fields of optical network communications, optical storage, a single-fiber 1000 megabits per second (Mbps) baseband transmission system (1000Base-SX), and the like.

An optical module includes a photoelectric device, a functional circuit, an optical interface, and the like, and the photoelectric device includes a transmit port and a receive port. The transmit port of the optical module converts an electric signal into an optical signal, and outputs the optical signal through an optical fiber. A receive port of a peer optical module converts the optical signal into the electric signal again.

A fault of an optical module is usually defined as an end of a service life of the optical module. In an application scenario, especially in a large data center, there are massive optical modules, and a fault of an optical module greatly affects key services. Therefore, engineers usually pay more attention on whether a fault of an optical module occurs in order to quickly locate the fault and resolve a problem in time.

Therefore, it is necessary to provide a method for predicting a fault of an optical module.

SUMMARY

This application provides a method for predicting a fault of an optical module, to predict, before a fault occurs, whether the fault will occur on an optical module, thereby helping a maintenance engineer focus on an optical module on which a fault may occur, and reducing impact caused by the fault of the optical module on a service.

According to a first aspect, a method for predicting a fault of an optical module is provided. The method includes obtaining a sequence to be detected of the optical module in a preset time period, where the sequence to be detected includes a plurality of measured values of an operating parameter of the optical module, obtaining a classification threshold corresponding to the operating parameter, where the classification threshold is generated based on a classification sample set corresponding to the operating parameter, and determining a first prediction result of the optical module based on comparison results between the classification threshold corresponding to the operating parameter and the plurality of measured values in the sequence to be detected, where the first prediction result indicates whether the optical module enters a faulty mode. Based on the foregoing technical solution, a classification threshold of an operating parameter is determined based on a classification sample set corresponding to the operating parameter of optical modules, and whether a fault occurs in the future on an optical module corresponding to a sequence to be detected is predicted based on the comparison results between the classification threshold and the plurality of measured values in the sequence to be detected, to help a maintenance engineer focus on an optical module on which a fault may occur, and reduce impact caused by the fault of the optical module on a service.

The foregoing operating parameter may be a bias current of the optical module or a receive power of the optical module, and the classification threshold may be a bias current classification threshold or a receive power classification threshold. In this application, whether a fault occurs on the optical module in the future may be predicted based on comparison results between the bias current classification threshold and a plurality of measured values of the bias current, and/or whether a fault occurs on the optical module in the future may be predicted based on comparison results between the receive power classification threshold and a plurality of measured values of the receive power.

It can be seen that when the classification threshold corresponding to the operating parameter is used to predict whether the optical module enters the faulty mode, only whether the optical module enters the faulty mode can be determined. When the optical module enters the faulty mode, an urgency level at which a fault occurs after the optical module enters the faulty mode cannot be determined. For the problem, in an embodiment of this application, a feature set generated based on the sequence to be detected may further be input into a fault prediction model, and the urgency level at which a fault occurs after the optical module enters the faulty mode is further determined using the fault prediction model.

In a possible implementation, when the first prediction result indicates that the optical module enters the faulty mode, the method further includes generating a feature set based on the sequence to be detected, and inputting the feature set into a fault prediction model to obtain a second prediction result, where the second prediction result indicates an urgency level at which a fault is expected to occur on the optical module.

Based on the foregoing technical solution, the feature set of the sequence to be detected is generated, and the feature set is input into the fault prediction model. The fault prediction model may predict the urgency level at which a fault occurs on the optical module from a current moment to help the maintenance engineer process, as soon as possible based on the urgency level at which a fault occurs on the optical module, an optical module on which a fault occurs in a relatively short time, and reduce the impact caused by the fault of the optical module on the service.

In a possible implementation, the method further includes obtaining a sample sequence corresponding to the operating parameter, determining a tag of the sample sequence based on the classification threshold and the sample sequence, where the tag indicates whether an optical module corresponding to the sample sequence is a normal optical module, or the tag indicates an urgency level at which a fault occurs on the optical module corresponding to the sample sequence, generating a fault prediction sample corresponding to the sample sequence, where the fault prediction sample includes a feature set of the sample sequence and the tag of the sample sequence, and generating the fault prediction model based on the fault prediction sample.

In a possible implementation, the method further includes updating the fault prediction model based on the feature set of the sequence to be detected and the second prediction result.

Based on the foregoing technical solution, when inputting the feature set corresponding to the sequence to be detected into the fault prediction model to obtain the second prediction result, an analyzer may use the second prediction result and the feature set corresponding to the sequence to be detected as an input of the fault prediction model such that the fault prediction model learns the input and an output to complete update of the fault prediction model, and a prediction result of the fault prediction model is more accurate.

In a possible implementation, before obtaining a classification threshold corresponding to the operating parameter, the method further includes obtaining the classification sample set corresponding to the operating parameter, where the classification sample set includes a plurality of classification samples, and each classification sample includes one measured value of the operating parameter and one first classification identifier, and determining, based on the classification sample set, the classification threshold corresponding to the operating parameter.

In a possible implementation, determining, based on the classification sample set, the classification threshold corresponding to the operating parameter includes determining a plurality of loss values based on the classification sample set and a plurality of reference classification thresholds, where each loss value corresponds to one reference classification threshold, and the plurality of reference classification thresholds are preset, or the plurality of reference classification thresholds are determined based on the measured value of each classification sample in the classification sample set, determining a reference classification threshold corresponding to a smallest loss value in the plurality of loss values as a classification threshold corresponding to the classification sample set, and determining, based on the classification threshold corresponding to the classification sample set, the classification threshold corresponding to the operating parameter.

In a possible implementation, determining a plurality of loss values based on the classification sample set and a plurality of reference classification thresholds includes reclassifying the classification samples in the classification sample set based on each of the plurality of reference classification thresholds, determining a second classification identifier of each classification sample in the classification sample set based on a classification result, and determining, based on the following loss function and the second classification identifier and the first classification identifier of each classification sample, a loss value corresponding to the reference classification threshold:

$$loss = \frac{1}{N}\sum_{q=1}^{N}(O_q - P_q)^2,$$

where loss represents a mean square error of all the first classification identifiers in the classification sample set and the corresponding second classification identifiers, N is a quantity of classification samples in the classification sample set, N is greater than or equal to 2, $O_q$ is a first classification identifier of a classification sample whose index value is q in the N classification samples, and $P_q$ is a second classification identifier of the classification sample whose index value is q.

The foregoing method for determining a classification threshold may be applied to scenarios in which the classification samples in the classification sample set only include positive samples, or only include negative samples, or include both positive samples and negative samples, and this is not limited in this application.

In a possible implementation, the classification sample set includes R positive samples and S negative samples, and determining a plurality of loss values based on the classification sample set and a plurality of reference classification thresholds includes reclassifying the classification samples in the classification sample set based on each of the plurality of reference classification thresholds, and determining a second classification identifier of each classification sample in the classification sample set based on a classification result, and determining, based on the following loss function and the second classification identifier and the first classification identifier of each classification sample, a loss value corresponding to the reference classification threshold:

$$loss = c \times loss_f + loss_n,$$

$$\text{where } loss_f = \frac{1}{R}\sum_{a=1}^{R}(O_a - P_a)^2, \text{ and}$$

$$loss_n = \frac{1}{S}\sum_{b=1}^{S}(O_b - P_b)^2,$$

where loss represents a mean square error of all the first classification identifiers in the classification sample set and the corresponding second classification identifiers, $loss_f$ represents a mean square error of first classification identifiers in all the positive samples and corresponding second classification identifiers, $loss_n$ represents a mean square error of first classification identifiers in all the negative samples and corresponding second classification identifiers, R is greater than or equal to 2, $O_a$ is a first classification identifier of a positive sample whose index value is a, $P_a$ is a second classification identifier of the positive sample whose index value is a, S is greater than or equal to 2, $O_b$ is a first classification identifier of a negative sample whose index value is b, $P_b$ is a second classification identifier of the negative sample whose index value is b, c is a weight coefficient, and c is greater than or equal to 1.

Based on the foregoing technical solution, when classification samples in a classification sample set corresponding to the receive power include both positive samples and negative samples, because a fault may occur on the optical module at a moment after the optical module is enabled, obtained measured values in the negative samples of the receive power may include a measured value that is of the receive power and that is generated when the optical module is in a normal state, causing impurity of the negative samples of the receive power.

Although the negative samples of the receive power may be impure, compared with the negative samples, the positive samples have relatively high reliability, and therefore, the classification threshold may be determined mainly based on the positive samples and using the negative samples as an important supplement, that is, accuracy of the classification threshold may be improved by intensifying the positive samples.

In a possible implementation, the operating parameter corresponds to M classification sample sets, and the determining, based on the classification threshold corresponding to the classification sample set, the classification threshold corresponding to the operating parameter includes determining M classification thresholds in the M classification sample sets, and determining, based on the following function, the classification threshold corresponding to the operating parameter:

$$thresh_{final} = \frac{1}{M}\sum_{i=1}^{M} thresh_i,$$

where $$thresh_{final} = \frac{1}{M}\sum_{i=1}^{M} thresh_i$$

is the classification threshold corresponding to the operating parameter, $thresh_i$ is a classification threshold corresponding to an $i^{th}$ classification sample set, and M is greater than 1.

Based on the foregoing technical solution, when the classification threshold is determined using the positive samples and the negative samples, if the optical module has a relatively low fault rate, a quantity of negative samples may be small, causing an imbalance between the positive samples and the negative samples. To resolve a problem of imbalance between the positive samples and the negative samples, M groups of positive samples may be obtained through a plurality of consecutive random samplings, and one classification threshold is determined based on each group of positive samples and the same group of negative samples, that is, each group of positive samples and the group of negative samples may be used as a classification sample set, and a classification threshold corresponding to the classification sample set is obtained. The M classification sample sets are obtained based on the M groups of positive samples and the groups of negative samples. Correspondingly, the M classification thresholds corresponding to the M classification sample sets may be obtained. An average of the M classification thresholds may be determined as the classification threshold corresponding to the operating parameter to resolve the problem of imbalance between the positive samples and the negative samples.

In a possible implementation, the operating parameter is a bias current, the classification threshold is a bias current classification threshold, the sample sequence is a sample sequence of the bias current, and determining a tag of the sample sequence based on the classification threshold and the sample sequence includes, if the sample sequence includes at least one measured value that is greater than or equal to the bias current classification threshold, determining the tag of the sample sequence based on a time interval between a collection end moment of the sample sequence and a moment at which a fault occurs on the optical module corresponding to the sample sequence, where the tag indicates the urgency level at which a fault occurs on the optical module corresponding to the sample sequence, or if all measured values in the sample sequence are less than the bias current classification threshold, determining the tag of the sample sequence, where the tag indicates that the optical module corresponding to the sample sequence is a normal optical module.

In a possible implementation, the operating parameter is a receive power, the classification threshold is a receive power classification threshold, the sample sequence is a sample sequence of the receive power, and determining a tag of the sample sequence based on the classification threshold and the sample sequence includes, if the sample sequence includes at least one measured value that is less than or equal to the receive power classification threshold, determining the tag of the sample sequence based on a time interval between a collection end moment of the sample sequence and a moment at which a fault occurs on the optical module corresponding to the sample sequence, where the tag indicates the urgency level at which a fault occurs on the optical module corresponding to the sample sequence, or if all measured values in the sample sequence are greater than the receive power classification threshold, determining the tag of the sample sequence, where the tag indicates that the optical module corresponding to the sample sequence is a normal optical module.

In a possible implementation, the feature set includes a feature set corresponding to a bias current and a feature set corresponding to a receive power, and inputting the feature set into a fault prediction model to obtain a second prediction result includes inputting the feature set corresponding to the bias current and the feature set corresponding to the receive power into the fault prediction model to obtain a third prediction result corresponding to the bias current and a fourth prediction result corresponding to the receive power, and determining the second prediction result based on the third prediction result and the fourth prediction result.

Based on the foregoing technical solution, if an input of the fault prediction model is a feature set corresponding to a receive power data sequence of the optical module and a feature set corresponding to a bias current data sequence of the optical module, the fault prediction model obtains two prediction results. When determining a prediction result for the optical module, the fault prediction model uses a prediction result having a higher urgency level in the two prediction results as the prediction result for the optical module such that the maintenance engineer can process, as soon as possible, the optical module on which a fault may occur, and the impact caused by the fault of the optical module on the service can be reduced.

According to a second aspect, an apparatus for predicting a fault of an optical module is provided. The apparatus includes modules configured to perform the method according to any one of the first aspect or the implementations of the first aspect.

According to a third aspect, an apparatus for predicting a fault of an optical module is provided. The apparatus includes a memory configured to store a program, and a processor configured to execute the program stored in the memory such that the apparatus implements the method according to any one of the first aspect or the implementations of the first aspect.

According to a fourth aspect, a computer-readable medium is provided. The computer-readable medium stores program code executed by a device, and the program code is used to perform the method according to any one of the first aspect or the implementations of the first aspect.

According to a fifth aspect, a computer program product that includes an instruction is provided. When the computer program product is run on a computer, the computer is enabled to perform the method according to any one of the first aspect or the implementations of the first aspect.

According to a sixth aspect, a chip is provided. The chip includes a processor and a data interface, and the processor reads, through the data interface, an instruction stored in a memory, to perform the method according to any one of the first aspect or the implementations of the first aspect.

Optionally, in an implementation, the chip may further include the memory, and the memory stores the instruction. The processor is configured to execute the instruction stored in the memory, and when the instruction is executed, the processor is configured to perform the method according to the first aspect.

According to a seventh aspect, a system for predicting a fault of an optical module is provided. The system includes the optical module, a collector, and the apparatus for predicting a fault of an optical module according to the second aspect. The collector is configured to collect a sequence to be detected of the optical module in a preset time period, where the sequence to be detected includes a plurality of measured values of an operating parameter of the optical module, and send the sequence to be detected to the apparatus for predicting a fault of an optical module.

For beneficial effects of the second to the seventh aspects in this application, refer to the beneficial effects of the first aspect and the implementations of the first aspect.

DESCRIPTION OF EMBODIMENTS

The following describes technical solutions of embodiments in this application with reference to the accompanying drawings.

Figure 1:
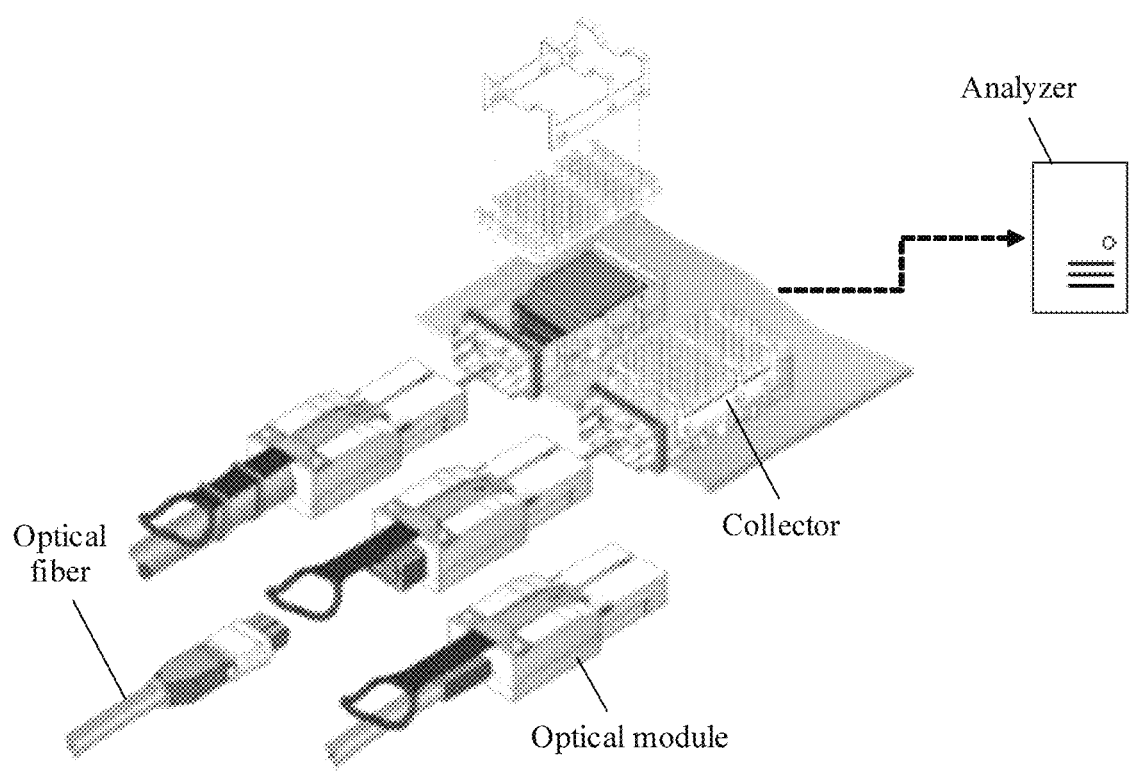
FIG. 1 is a schematic diagram of a hardware connection relationship applicable to an embodiment of this application during fault detection of an optical module.

FIG. 1 shows a hardware connection relationship between an optical module and other devices during fault detection of the optical module. As shown in FIG. 1, on one hand, the optical module is connected to an external device (not shown in the figure) through an optical fiber to implement optical-to-electrical conversion between the external device and a device (which may be referred to as host device and is not shown in the figure) in which the optical module is located, that is, to convert an optical signal received from the external device to an electrical signal that the host device can process, or to convert an electrical signal received from the host device to an optical signal that the external device can process. On the other hand, the optical module is connected to a collector. The collector collects a measured value corresponding to an operating parameter when the optical module operates, and sends the collected measured value to an analyzer, and the analyzer analyzes, based on the measured value collected by the collector, whether a fault will occur on the optical module. The operating parameter of the optical module mainly includes a receive power and a bias current.

In an application, the analyzer may be a component or device with a computing function and a storage function. For example, the analyzer may be a server.

Figure 2:
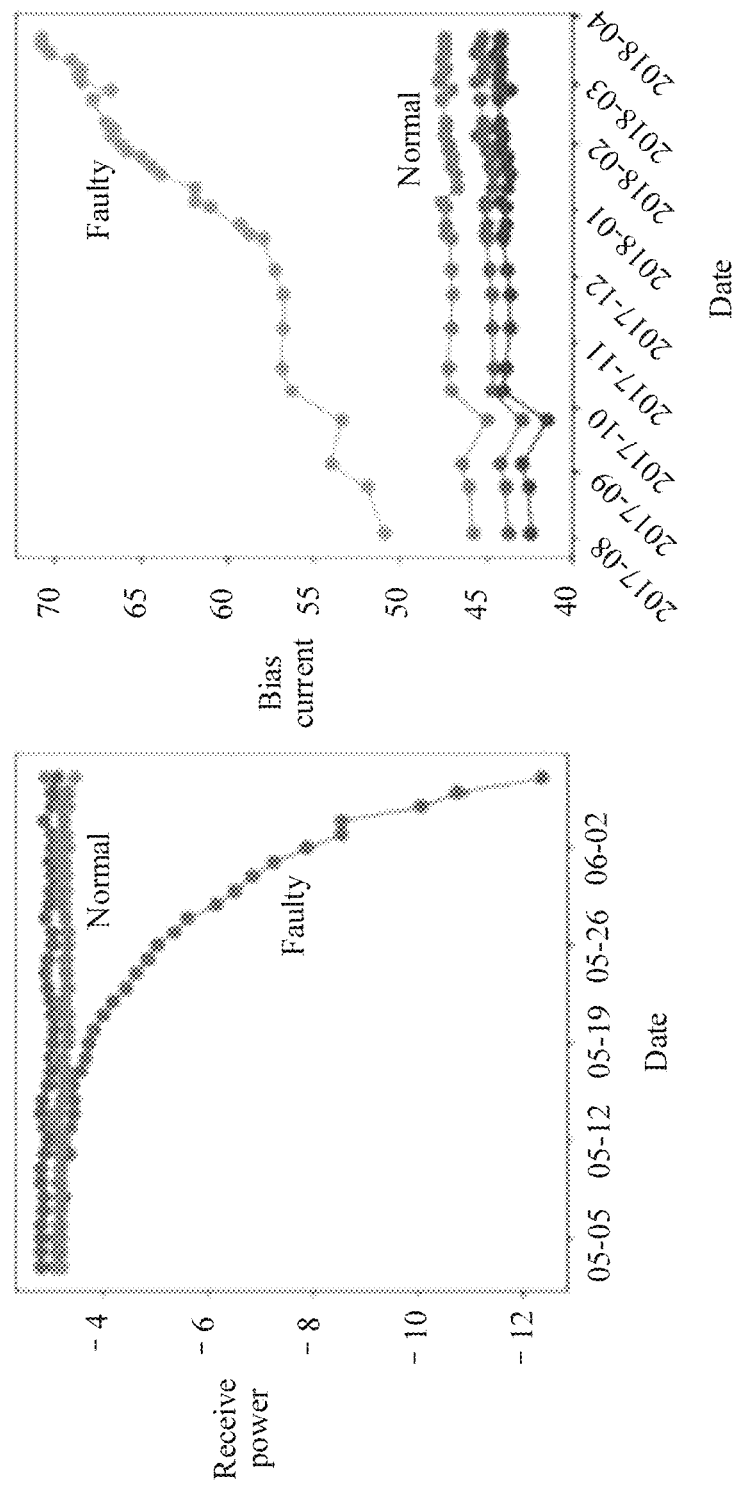
FIG. 2 is a schematic diagram of change trends that are of a receive power and a bias current when an optical module that is originally normal gradually becomes faulty and that are applicable to an embodiment of this application.

It is found through analysis, that when the optical module gradually becomes faulty, the receive power and the bias current generally present a trend (the receive power presents a descending trend, and the bias current presents an ascending trend). FIG. 2 shows change trends of the receive power and the bias current when an optical module that is originally normal gradually becomes faulty.

Based on the foregoing findings, this application provides a method for predicting a fault of an optical module. A classification threshold of an operating parameter is determined based on a classification sample set corresponding to the operating parameter of optical modules, and whether a fault occurs in the future on an optical module corresponding to a sequence to be detected is predicted based on comparison results between the classification threshold and a plurality of measured values in the sequence to be detected to help a maintenance engineer focus on an optical module on which a fault may occur, and reduce impact caused by the fault of the optical module on a service.

In the embodiments of this application, the operating parameter may be a bias current of an optical module or a receive power of the optical module, and the classification threshold may be a bias current classification threshold or a receive power classification threshold. In the embodiments of this application, whether a fault occurs on an optical module in the future may be predicted based on comparison results between the bias current classification threshold and a plurality of measured values of the bias current, and/or whether a fault occurs on the optical module in the future may be predicted based on comparison results between the receive power classification threshold and a plurality of measured values of the receive power. The method for predicting a fault of an optical module that is provided in the embodiments of this application is described in detail below with reference to FIG. 3 to FIG. 6.

In an embodiment, the analyzer obtains the measured values of the operating parameter of the optical module using the collector (for example, the analyzer obtains the measured values of the bias current of the optical module or the measured values of the receive power of the optical module using the collector), and stores the obtained measured values of the operating parameter for subsequent processing.

Figure 3:
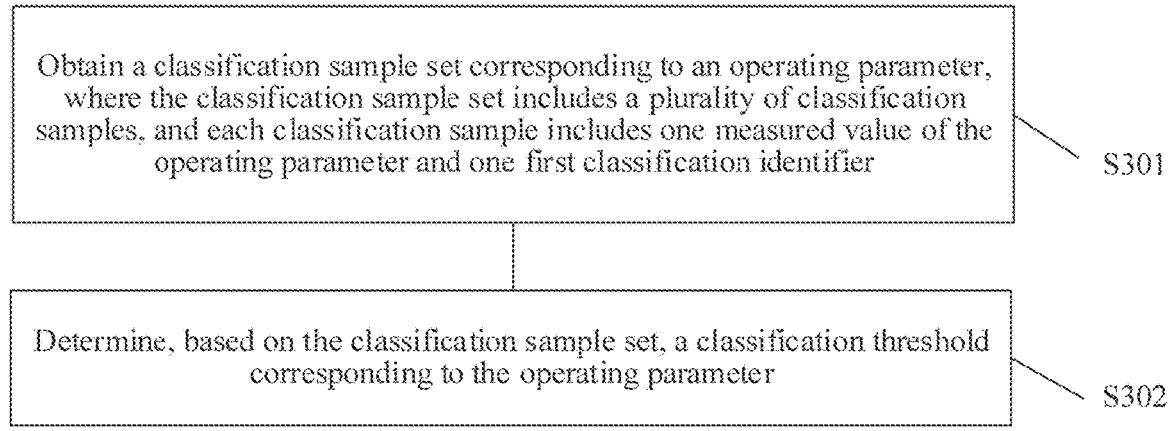
FIG. 3 is a schematic flowchart of a method for determining a classification threshold corresponding to an operating parameter according to an embodiment of this application.

First, a method for determining a classification threshold that is provided in this application is described with reference to FIG. 3, and the method includes steps S301 and S302.

Step S301. Obtain a classification sample set corresponding to an operating parameter, where the classification sample set includes a plurality of classification samples, and each classification sample includes one measured value of the operating parameter and one first classification identifier.

In an implementation, the analyzer obtains the classification sample set corresponding to the operating parameter, where the classification sample set includes the plurality of classification samples, and each classification sample includes one measured value of the operating parameter and one first classification identifier. The classification sample set is used to determine a classification threshold corresponding to the operating parameter.

For example, when the operating parameter is receive power, the analyzer obtains a classification sample set of the receive power, the classification sample set of the receive power includes a plurality of classification samples of the receive power, and each classification sample of the receive power includes one measured value of the receive power and one first classification identifier corresponding to the measured value.

The first classification identifier may be used to indicate that a classification sample is a positive sample or a negative sample. In an actual application, the first classification identifier may be indicated using a number of bits. For example, the first classification sample is indicated using one bit. When a value of the first classification identifier is 0, it indicates that the classification sample is a positive sample, or when a value of the first classification identifier is 1, it indicates that the classification sample is a negative sample.

When the first classification identifier indicates that the classification sample is a positive sample, it indicates that the measured value in the classification sample comes from a normal optical module, and when the first classification identifier indicates that the classification sample is a negative sample, it indicates that the measured value in the classification sample comes from a faulty optical module.

Step S302. Determine, based on the classification sample set, a classification threshold corresponding to the operating parameter.

In an implementation, the analyzer determines a plurality of loss values based on the classification sample set and a plurality of reference classification thresholds, where each loss value corresponds to one reference classification threshold, and the analyzer determines a reference classification threshold corresponding to a smallest loss value in the plurality of loss values as the classification threshold. The plurality of reference classification thresholds are preset, or the plurality of reference classification thresholds are determined based on the measured value of each classification sample in the classification sample set. In an implementation, the analyzer reclassifies the samples in the classification sample set based on each of the plurality of reference classification thresholds, and determines a second classification identifier of each sample in the classification sample set based on a classification result obtained through the reclassification. Then, the analyzer determines, based on a formula (1) and the second classification identifier and the first classification identifier of each sample, the loss value corresponding to each reference classification threshold. The formula (1) is:

$$\text{loss} = \frac{1}{N}\sum_{q=1}^{N}(O_q - P_q)^2, \quad (1)$$

where the formula (1) is a loss function, loss represents a mean square error of all the first classification identifiers in the classification sample set and the corresponding second classification identifiers, N is a quantity of classification samples in the classification sample set, N is greater than or equal to 2, $O_q$ is a first classification identifier of a classification sample whose index value is q in the N classification samples, and $P_q$ is a second classification identifier of the classification sample whose index value is q.

The following uses an example in which the analyzer uses the classification sample set of the receive power of an optical module, to describe the method for determining a classification threshold.

In an implementation, the classification sample set of the receive power includes a plurality of classification samples of the receive power. Assuming that first classification identifiers in the plurality of classification samples of the receive power indicate that the plurality of classification samples of the receive power are all positive samples, the analyzer reclassifies the plurality of classification samples of the receive power using the plurality of reference classification thresholds when determining the plurality of loss values. In a classification, the analyzer reclassifies the plurality of classification samples of the receive power using one reference classification threshold, to obtain a second classification identifier of each classification sample of the receive power, and obtains a loss value based on the second classification identifier and the first classification identifier of each classification sample of the receive power.

In an implementation, the analyzer reclassifies the plurality of samples of the receive power using one reference classification threshold. For example, the analyzer compares a measured value in each classification sample of the receive power with the reference classification threshold. If a measured value in a classification sample of the receive power is less than or equal to the reference classification threshold, because the receive power presents a descending trend when the optical module becomes gradually faulty, the analyzer determines a second classification identifier of the classification sample of the receive power based on this comparison result.

Because the measured value in the classification sample of the receive power is less than or equal to the reference classification threshold, the analyzer may identify the classification sample of the receive power as a negative sample using the second classification identifier.

Similarly, the second classification identifier may also be indicated using a number of bits. For example, the second classification identifier may be indicated using one bit. When a value of the second classification identifier is 0, it indicates that the classification sample is a positive sample, or when a value of the second classification identifier is 1, it indicates that the classification sample is a negative sample.

After all the classification samples of the receive power in the classification sample set of the receive power are reclassified using the reference classification threshold, each classification sample of the receive power corresponds to one first classification identifier and one second classification identifier, and the analyzer may determine, based on the first classification identifier, the second classification identifier, and the loss function in the formula (1), the loss value corresponding to the reference classification threshold.

Based on the foregoing method, a loss value may be obtained based on the loss function in the formula (1) for each reference classification threshold. The plurality of loss values may be obtained based on the loss function in the formula (1) for the plurality of reference classification thresholds.

The plurality of reference classification thresholds may be preset, or the plurality of reference classification thresholds may be determined based on the measured value of each classification sample of the receive power in the classification sample set of the receive power.

For example, in an implementation, in an interval from a smallest measured value of the receive power to a largest measured value of the receive power, the interval is traversed by a step, a traversed value is used as a reference classification threshold, and the reference classification threshold is used to reclassify the classification samples of the receive power in the classification sample set of the receive power. For example, if the smallest measured value of the receive power is 1.2, the largest measured value of the receive power is 3, and the step is 0.3, the plurality of reference classification thresholds may be 1.2, 1.5, 1.8, 2.1, 2.4, 2.7, and 3.

For another example, assuming that the classification sample set of the receive power includes X classification samples of the receive power, the analyzer obtains X measured values from the X classification samples of the receive power, and sorts the X measured values (in ascending order or descending order) to obtain a sequence, and the analyzer samples the sequence by a step Y to obtain a plurality of measured values, uses the plurality of measured values as reference classification thresholds, and reclassifies the classification samples of the receive power in the classification sample set of the receive power using the reference classification thresholds. For example, when X is equal to 30 and Y is equal to 10, the analyzer obtains the $10^{th}$, the $20^{th}$, and the $30^{th}$ measured values in the 30 measured values to obtain three reference classification thresholds.

In conclusion, in this application, the analyzer can obtain the plurality of loss values based on the plurality of reference classification thresholds and using the foregoing method for determining the loss value, and each loss value corresponds to one reference classification threshold. The analyzer determines the reference classification threshold corresponding to the smallest loss value in the plurality of loss values as a receive power classification threshold.

The foregoing only uses an example in which the classification samples in the classification sample set corresponding to the receive power are positive samples for description, but is not intended to limit this application. In an actual application, the foregoing method for determining a classification threshold is also applicable to a scenario in which the classification samples in the classification sample set only include positive samples, or only include negative samples, or include both positive samples and negative samples. This is not limited in this embodiment of this application.

When the classification samples in the classification sample set corresponding to the receive power include both positive samples and negative samples, because a fault may occur on the optical module at a moment after the optical module is enabled, obtained measured values in the negative samples of the receive power may include a measured value that is of the receive power and that is generated when the optical module is in a normal state, causing impurity of the negative samples of the receive power.

Although the negative samples of the receive power may be impure, compared with the negative samples, the positive samples have relatively high reliability, and therefore, the classification threshold may be determined mainly based on the positive samples and using the negative samples as an important supplement, that is, accuracy of the classification threshold may be improved by intensifying the positive samples. The following describes the method.

Optionally, the classification sample set includes R positive samples and S negative samples, and the analyzer may determine the plurality of loss values based on the classification sample set and the plurality of reference classification thresholds.

In an implementation, the analyzer classifies the classification samples in the classification sample set based on each of the plurality of reference classification thresholds, and determines a second classification identifier of each classification sample in the classification sample set based on a classification result, and then, the analyzer determines a loss value corresponding to the reference classification threshold based on a formula (2), a formula (3), a formula (4), and the second classification identifier and the first classification identifier of each classification sample:

$$\mathrm{loss} = c \times \mathrm{loss}_f + \mathrm{loss}_n, \qquad (2)$$

$$\mathrm{loss}_f = \frac{1}{R}\sum_{a=1}^{R}(O_a - P_a)^2, \text{ and} \qquad (3)$$

$$\mathrm{loss}_n = \frac{1}{S}\sum_{b=1}^{S}(O_b - P_b)^2, \qquad (4)$$

where loss represents a mean square error of all the first classification identifiers in the classification sample set and the corresponding second classification identifiers, $\mathrm{loss}_f$ represents a mean square error of first classification identifiers in all the positive samples and corresponding second classification identifiers, $\mathrm{loss}_n$ represents a mean square error of first classification identifier in all the negative samples and corresponding second classification identifiers, R is greater than or equal to 2, $O_a$ is a first classification identifier of a positive sample whose index value is a, $P_a$ is a second classification identifier of the positive sample whose index value is a, S is greater than or equal to 2, $O_b$ is a first classification identifier of a negative sample whose index value is b, $P_b$ is a second classification identifier of a negative sample whose index value is b, c is a weight coefficient, and c is greater than 1.

In this implementation, for the classification sample set of the receive power, when the loss value is calculated based on the reference classification threshold, the loss values are calculated separately based on the positive samples of the receive power and the negative samples of the receive power.

For example, loss values corresponding to the positive samples of the receive power are calculated based on the formula (3), and loss values corresponding to the negative samples of the receive power are calculated based on the formula (4). After the loss values corresponding to the positive samples of the receive power and the loss values corresponding to the negative samples of the receive power are obtained, a sum of the loss values corresponding to the positive samples of the receive power and the loss values corresponding to the negative samples of the receive power may be calculated based on the formula (2).

In conclusion, in this application, the analyzer can obtain the plurality of loss values based on the plurality of reference classification thresholds and using the foregoing method for determining the loss value, and each loss value corresponds to one reference classification threshold. The analyzer determines the reference classification threshold corresponding to the smallest loss value in the plurality of loss values as the classification threshold.

If the plurality of loss values are determined based on the classification sample set corresponding to the receive power, the classification threshold corresponds to the receive power, or if the plurality of loss values are determined based on the classification sample set corresponding to a bias current, the classification threshold corresponds to the bias current.

When the classification threshold is determined using the positive samples and the negative samples, a relatively low fault rate of the optical module causes a small quantity of negative samples, and further causes an imbalance between the positive and negative samples.

In an implementation, to resolve a problem of imbalance between the positive and negative samples, M groups of positive samples may be obtained through a plurality of consecutive random samplings, and one classification threshold is determined based on each group of positive samples and the same group of negative samples, that is, each group of positive samples and the group of negative samples may be used as a classification sample set, and a classification threshold corresponding to the classification sample set is obtained. Therefore, M classification sample sets are obtained based on the M groups of positive samples and the groups of negative samples. Correspondingly, the analyzer may obtain M classification thresholds corresponding to the M classification sample sets. The analyzer may determine, based on the following formula (5) and the M classification thresholds corresponding to the M classification sample sets, the classification threshold corresponding to the operating parameter. The formula (5) is:

$$thresh_{final} = \frac{1}{M}\sum_{i=1}^{M} thresh_i, \qquad (5)$$

where $thresh_{final}$ is the classification threshold of the operating parameter, $thresh_i$ is a classification threshold (a classification threshold corresponding to an $i^{th}$ classification sample set) determined based on a positive sample obtained in an $i^{th}$ sampling.

The foregoing only uses an example in which the operating parameter is the receive power to describe the method for determining a classification threshold, and the method is also applicable to determine the bias current classification threshold when the operating parameter is the bias current. Therefore, for a method for determining the bias current classification threshold, refer to the foregoing related descriptions.

In the foregoing embodiment, the method for generating the classification threshold corresponding to the operating parameter is performed by the analyzer.

In another embodiment, the method for generating the classification threshold corresponding to the operating parameter in this application may alternatively be performed by a controller.

When the method is performed by the controller, the controller may actively send, or may send in response to a request from the analyzer, the determined classification threshold to the analyzer.

The controller may be configured to manage a plurality of analyzers. The controller may also communicate with one or more collectors, and obtain measured values of the operating parameter that are collected by the one or more collectors in order to generate a fault prediction model or the classification threshold corresponding to the operating parameter.

Figure 4:
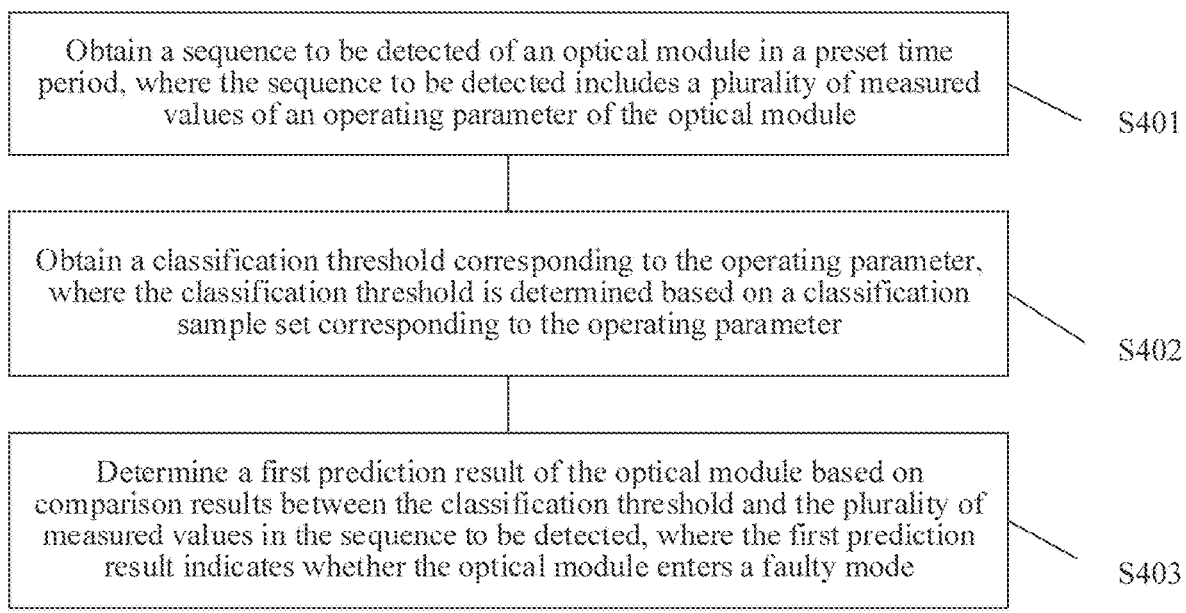
FIG. 4 is a schematic flowchart of a method for predicting whether an optical module enters a faulty mode according to an embodiment of this application.

The following describes, with reference to FIG. 4, a method for predicting whether an optical module enters a faulty mode that is provided in this application. The method is performed by the analyzer, and includes steps S401 to S403.

Step S401. Obtain a sequence to be detected of the optical module in a preset time period, where the sequence to be detected includes a plurality of measured values of an operating parameter of the optical module.

In an implementation, the analyzer obtains the sequence to be detected of the optical module in the preset time period, where the sequence to be detected includes the plurality of measured values corresponding to the operating parameter of the optical module that are generated in the preset time period.

The optical module is an optical module to be detected, the plurality of measured values may be collected by the collector by monitoring the optical module to be detected and sent to the analyzer. The collector may send the collected measured values of the operating parameter to the analyzer in real time, or may send the collected measured values of the operating parameter to the analyzer according to an instruction or based on a specified period.

For example, the analyzer obtains a plurality of measured values of an operating parameter of an optical module in a preset time period (for example, 30 days), and the plurality of measured values of the operating parameter that are obtained in the time period may be referred to as the sequence to be detected.

Assuming that the optical module is measured once a day, when the operating parameter is a receive power, one measured value of the receive power of the optical module is obtained every day. Therefore, the analyzer stores 30 measured values of the receive power after 30 days.

When the operating parameter is a bias current, one measured value of the bias current of the optical module is obtained every day. Therefore, the analyzer stores 30 measured values of the bias current after 30 days.

Step S402. Obtain a classification threshold corresponding to the operating parameter, where the classification threshold is determined based on a classification sample set corresponding to the operating parameter.

In an implementation, the analyzer obtains the classification threshold corresponding to the operating parameter, where the classification threshold is determined based on the classification sample set corresponding to the operating parameter.

When the operating parameter is the receive power, the analyzer obtains a receive power classification threshold, and the receive power classification threshold is determined based on a classification sample set of the receive power, or when the operating parameter is the bias current, the analyzer obtains a bias current classification threshold, and the bias current classification threshold is determined based on a classification sample set of the bias current.

The analyzer may obtain the classification threshold corresponding to the operating parameter.

The classification threshold corresponding to the operating parameter may be generated by the analyzer, or may be obtained by the analyzer from a controller. A specific obtaining manner is not limited in this application.

Step S403. Determine a first prediction result of the optical module based on comparison results between the classification threshold corresponding to the operating parameter and the plurality of measured values in the sequence to be detected, where the first prediction result indicates whether the optical module enters a faulty mode.

The analyzer may compare the classification threshold with the plurality of measured values in the sequence to be detected, and determine the first prediction result of the optical module based on the comparison results between the classification threshold and the plurality of measured values in the sequence to be detected, where the first prediction result indicates whether the optical module enters the faulty mode.

In an implementation, the analyzer compares the 30 measured values of the receive power with the receive power classification threshold. If at least one of the 30 measured values of the receive power is less than or equal to the receive power classification threshold, the first prediction result determined by the analyzer indicates that the optical module enters the faulty mode, or if all the 30 measured values of the receive power are greater than the receive power classification threshold, the first prediction result determined by the analyzer indicates that the optical module does not enter the faulty mode.

In another implementation, the analyzer compares the 30 measured values of the bias current with the bias current classification threshold. If at least one of the 30 measured values of the bias current is greater than or equal to the bias current classification threshold, the first prediction result determined by the analyzer indicates that the optical module enters the faulty mode, or if all the 30 measured values of the bias current are less than the bias current classification threshold, the first prediction result determined by the analyzer indicates that the optical module does not enter the faulty mode It can be seen that when the classification threshold corresponding to the operating parameter is used to predict whether the optical module enters the faulty mode, only whether the optical module enters the faulty mode can be determined. When the optical module enters the faulty mode, an urgency level at which a fault occurs after the optical module enters the faulty mode cannot be determined. For the problem, in this embodiment of this application, a feature set generated based on the sequence to be detected may further be input into a fault prediction model, and the urgency level at which a fault occurs after the optical module enters the faulty mode is further determined using the fault prediction model. The fault prediction model used in this application may be generated by the analyzer or the controller.

Figure 5:
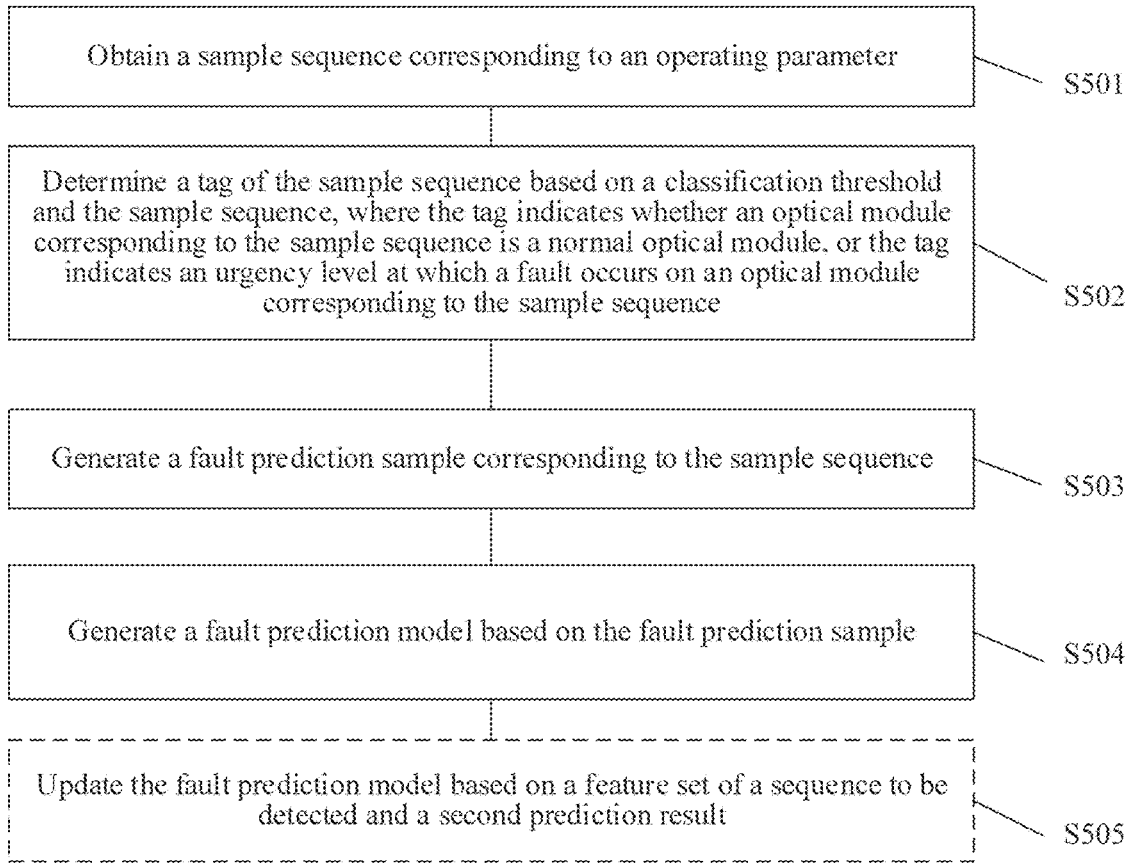
FIG. 5 is a schematic flowchart of a method for generating a fault prediction model according to an embodiment of this application.

The following describes, with reference to FIG. 5, a method for generating a fault prediction model that is provided in this application, and the method includes steps S501 to S504.

Step S501. Obtain a sample sequence corresponding to an operating parameter.

In this application, a sequence to be detected and the sample sequence both include measured values corresponding to the operating parameter, but are used in different scenarios The sequence to be detected corresponds to an optical module to be detected, and has real-time quality. For example, as long as the collector collects a sequence to be detected of an optical module, the collector sends the sequence to be detected to the analyzer to ensure timeliness and accuracy of a prediction result of predicting whether a fault occurs on the optical module in the future. The sample sequence corresponding to the operating parameter is used to generate a fault prediction model. Therefore, a large quantity of sample sequences are required, and the collector may first collect a large quantity of sample sequences and then send all the sample sequences to the analyzer, or may separately send each sample sequence to the analyzer after collecting the sample sequence. Each sample sequence includes a measured value corresponding to a same optical module, but different sample sequences may correspond to different optical modules.

In another implementation, the collector does not distinguish sample sequences, but sends, to the analyzer, all collected measured values corresponding to an operating parameter of each optical module, and the analyzer determines, based on all the received measured values, a sample sequence corresponding to the operating parameter.

When the operating parameter is a receive power, the analyzer obtains a sample sequence of the receive power of the optical module, and when the operating parameter is a bias current, the analyzer obtains a sample sequence of the bias current of the optical module.

For example, the sample sequence that is obtained by the analyzer and that corresponds to the operating parameter may be indicated as:

$$I=[data_{j-t+1}, data_{j-t+2}, \ldots, data_j] \quad (6),$$

where I represents the sample sequence corresponding to the operating parameter, j is a collection end moment of a sample sequence, and t is a collection time length. For example, a collection end moment of a sample sequence is the $60^{th}$ day from a moment (collection start moment) at which the collector starts to collect measured values of the operating parameter, that is, j=60, the sample sequence includes measured values of the receive power from the $31^{st}$ day to the $60^{th}$ day, that is, t=30, and a time length from a current moment to the collection start moment is greater than or equal to 60 days. When a fault occurs on the optical module, a collection end moment of the last sample sequence of the optical module is a moment at which a fault occurs on the optical module.

Step S502. Determine a tag of the sample sequence based on a classification threshold and the sample sequence, where the tag indicates whether the optical module corresponding to the sample sequence is a normal optical module, or the tag indicates an urgency level at which a fault occurs on the optical module corresponding to the sample sequence.

In an implementation, the analyzer may determine the tag of the sample sequence based on the classification threshold and the sample sequence that correspond to the operating parameter, where the tag may indicate whether the optical module corresponding to the sample sequence is a normal optical module, or the tag may indicate the urgency level at which a fault occurs on the optical module corresponding to the sample sequence.

When the operating parameter is the receive power, the analyzer may compare measured values in the sample sequence of the receive power with a receive power classification threshold, and determine, if at least one measured value of the receive power is less than or equal to the receive power classification threshold, that the optical module corresponding to the sample sequence enters a faulty mode.

Further, the analyzer may determine the tag of the sample sequence based on a time interval between a collection end moment of the sample sequence and a moment at which a fault occurs on the optical module corresponding to the sample sequence, where the tag indicates an urgency level at which a fault occurs on the optical module corresponding to the sample sequence.

For example, a collection end moment of a sample sequence is the $60^{th}$ day, in this case, j=60, the sample sequence includes measured values of the receive power from the 31$^{st}$ day to the 60$^{th}$ day, that is, t=30, and a current moment is the 120$^{th}$ day from a collection start moment. Assuming that the analyzer already knows that a fault occurs on the optical module corresponding to the sample sequence on the 80$^{th}$ day, a time interval between the collection end moment of the sample sequence and a moment at which a fault occurs on the optical module corresponding to the sample sequence is 20. The analyzer may determine, based on the time interval, that a fault occurs on the optical module corresponding to the sample sequence after 20 days starting from the 60$^{th}$ day.

The analyzer may further compare the value 20 with a preset time interval threshold, where for example, the time interval threshold is 30, and determine, based on a comparison result between the time interval and the time interval threshold, an urgency level at which a fault occurs on the optical module corresponding to the sample sequence.

For example, the analyzer determines that the time interval 20 is less than the time interval threshold 30, and may determine that, the tag of the sample sequence indicates that the urgency level at which a fault occurs on the optical module from the collection end moment (the 60$^{th}$ day) of the sample sequence is urgent.

If the measured values of the receive power are all greater than or equal to the receive power classification threshold, it may be determined that the tag of the sample sequence indicates that the optical module corresponding to the sample sequence is a normal optical module.

When the operating parameter is the bias current, the analyzer may compare measured values in the sample sequence of the bias current with a bias current classification threshold, and may determine, if at least one measured value of the bias current is greater than or equal to the bias current classification threshold, that the optical module corresponding to the sample sequence enters a faulty mode.

Further, the analyzer may determine the tag of the sample sequence based on a time interval between a collection end moment of the sample sequence and a moment at which a fault occurs on the optical module corresponding to the sample sequence, where the tag indicates an urgency level at which a fault occurs on the optical module corresponding to the sample sequence.

For example, the collection end moment of the sample sequence is the 90$^{th}$ day, in this case, j=90, the sample sequence includes measured values of the bias current from the 61$^{st}$ day to the 90$^{th}$ day, that is, t=30, and a current moment is the 180$^{th}$ day from a collection start moment.

Assuming that the analyzer already knows that a fault occurs on the optical module corresponding to the sample sequence on the 150$^{th}$ day, the time interval between the collection end moment of the sample sequence and the moment at which a fault occurs on the optical module corresponding to the sample sequence is 60. The analyzer may determine, based on the time interval, that a fault occurs on the optical module corresponding to the sample sequence after 60 days starting from the 90$^{th}$ day.

The analyzer may further compare the value 60 with a preset time interval threshold, where for example, the time interval threshold is 30, and determine, based on a comparison result between the time interval and the time interval threshold, the urgency level at which a fault occurs on the optical module corresponding to the sample sequence.

For example, the analyzer determines that the time interval 60 is greater than the time interval threshold 30, and may determine that, the tag of the sample sequence indicates that the urgency level at which a fault occurs on the optical module from the collection end moment (the 90$^{th}$ day) of the sample sequence is less urgent.

If the measured values of the bias current are all less than the bias current classification threshold, it may be determined that the tag of the sample sequence indicates that the optical module corresponding to the sample sequence is a normal optical module.

For example, a value of the tag may be 0, 1, or 2, where 0 indicates that the optical module is a normal optical module, 1 indicates that the time interval of the optical module from the collection end moment to the moment at which a fault occurs is less than or equal to the preset time interval threshold (that is, the urgency level at which a fault occurs is urgent), and 2 indicates that the time interval of the optical module from the collection end moment to the moment at which a fault occurs is greater than the preset time interval threshold (that is, the urgency level at which a fault occurs is less urgent).

Step S503. Generate a fault prediction sample corresponding to the sample sequence, where the fault prediction sample includes a feature set of the sample sequence and the tag of the sample sequence.

In an implementation, the analyzer determines the tag of the sample sequence corresponding to the operating parameter, and may generate, based on the sample sequence and the determined tag, the fault prediction sample corresponding to the sample sequence, where the fault prediction sample includes the feature set of the sample sequence and the tag of the sample sequence.

For example, the feature set determined based on the sample sequence may be F=[mean, var, max, min, diff_mean, diff_var], where mean represents an average of the sample sequence, var represents a variance of the sample sequence, max represents a maximum value of the sample sequence, min represents a minimum value of the sample sequence, diff_mean represents a one-dimensional differential mean of the sample sequence, and diff_var represents a one-dimensional differential variance of the sample sequence.

For example, the sample sequence includes bias current values that have a collection time length of 30 days:
I=[49.96, 50.02, 50.08, 50.14, 50.21, 50.27, 50.33, 50.4, 50.46, 50.52, 50.58, 50.64, 50.71, 50.77, 50.83, 50.9, 50.96, 51.02, 51.16, 51.3, 51.44, 51.59, 51.73, 51.87, 52.01, 52.15, 52.29, 52.43, 52.58, 52.72], and
a corresponding feature set is: F=[51.07, 0.66, 49.96, 52.72, 0.44, 0.026].

Step S504. Generate the fault prediction model based on the fault prediction sample.

In an implementation, when the fault prediction model is trained, the feature set of the sample sequence and the tag of the sample sequence may be separately used as an output and an input such that the fault prediction model learns the input and the output, to train the fault prediction model.

The time interval threshold and the value of the tag that are listed above are both used as examples, and do not constitute a limitation on this application. A form and the value of the tag may be set.

When the fault prediction model is trained, one sample sequence comes from a same optical module. In this embodiment of this application, an example in which a feature set determined based on one sample sequence is input into the fault prediction model is used to describe a method for training the fault prediction model. In an actual training process of the fault prediction model, feature sets determined based on a large quantity of sample sequences are input into the fault prediction model, to train the fault prediction model.

In all the foregoing implementations, the analyzer is used as an example to describe a process of generating the fault prediction model. In an actual application, a controller may alternatively generate the fault prediction model based on the method shown in FIG. 5. In another implementation, the analyzer may perform one or more steps in steps S501 to S503, and the controller performs a step in FIG. 5 other than the step performed by the analyzer. If step S504 is performed by the controller, the controller needs to actively send, or send in response to a request from the analyzer, the generated fault prediction model to the analyzer.

A method for determining an urgency level at which a fault might occurs on an optical module that is provided in this application is described below with reference to FIG. 6, and the method includes steps S601 to S602.

Step S601. Generate a feature set based on a sequence to be detected of an optical module.

Step S602. Input the feature set into a fault prediction model to obtain a second prediction result, where the second prediction result indicates an urgency level at which a fault is expected to occur on the optical module.

Further, in step S601, the analyzer generates the feature set of the sequence to be detected, and in step S602, the analyzer inputs the feature set into the fault prediction model to obtain the second prediction result, where the second prediction result indicates the urgency level at which a fault is expected to occur on the optical module.

For a method for generating the feature set of the sequence to be detected based on the sequence to be detected, refer to the foregoing related descriptions of generating the feature set of the sample sequence based on the sample sequence, and details are not described herein again.

For example, the analyzer inputs the feature set of the sequence to be detected into the fault prediction model, the fault prediction model outputs the second prediction result, and the second prediction result indicates the urgency level at which a fault is expected to occur on the optical module. The urgency level at which a fault is expected to occur on the optical module may be indicated using a value relationship between a preset time interval threshold and a time interval from a current moment to a moment at which a fault occurs. For example, when a value of the second prediction result is 1, it indicates that the time interval of the optical module from the current moment to the moment at which a fault occurs is less than or equal to the preset time interval threshold, and when the value of the second prediction result is 2, it indicates that the time interval of the optical module from the current moment to the moment at which a fault occurs is greater than the preset time interval threshold.

The feature set of the sequence to be detected is generated, and the feature set is input into the fault prediction model such that the fault prediction model can predict the urgency level at which a fault occurs on the optical module from a current moment to help a maintenance engineer process, based on the urgency level at which a fault occurs on the optical module, the optical module as soon as possible in a relatively short time, and reduce impact caused by the fault of the optical module on a service.

When a feature set corresponding to a bias current is input to the fault prediction model, an obtained second prediction result is determined based on the feature set corresponding to the bias current, and when a feature set corresponding to a receive power is input to the fault prediction model, an obtained second prediction result is determined based on the feature set corresponding to the receive power.

If a feature set corresponding to a receive power and a feature set corresponding to a bias current that are of a same optical module are input into the fault prediction model, the fault prediction model obtains a prediction result corresponding to the bias current (for example, a third prediction result) and a prediction result corresponding to the receive power (for example, a fourth prediction result). In this case, the fault prediction model may determine the second prediction result with reference to both the third prediction result and the fourth prediction result.

For example, a value of the third prediction result that is obtained after the fault prediction model processes the feature set corresponding to the receive power is 1, and a value of the fourth prediction result that is obtained after the fault prediction model processes the feature set corresponding to the bias current is 2. The third prediction result whose value is 1 indicates that the time interval of the optical module from the current moment to the moment at which a fault occurs is less than or equal to the preset time interval threshold, and the fourth prediction result whose value is 2 indicates that the time interval of the optical module from the current moment to the moment at which a fault occurs is greater than the preset time interval threshold. By contrast, the third prediction result whose value is 1 corresponds to a higher urgency level. Therefore, the fault prediction model may determine the third prediction result whose value is 1 as the second prediction result of the optical module, and finally output the second prediction result.

That is, when the fault prediction model outputs two prediction results, the two prediction results may be the same or different. In this case, the second prediction result may be determined based on Table 1 (using an example in which values of the prediction result include 0, 1, and 2 for description):

TABLE 1

| Bias current | Receive power | | |
|---|---|---|---|
| | 0 | 1 | 2 |
| 0 | 0 | 1 | 2 |
| 1 | 1 | 1 | 1 |
| 2 | 2 | 1 | 2 |

It can be learned in FIG. 1 that when the two prediction results are different, a prediction result with a higher urgency level in the two prediction results may be used as the second prediction result.

If an input of the fault prediction model is a feature set corresponding to a receive power data sequence of the optical module and a feature set corresponding to a bias current data sequence of the optical module, the fault prediction model obtains two prediction results. When determining a prediction result for the optical module, the fault prediction model uses a prediction result having a higher urgency level in the two prediction results as the prediction result for the optical module such that the maintenance engineer can process, as soon as possible, the optical module on which a fault may occur, and the impact caused by the fault of the optical module on the service can be reduced.

In addition, when the feature set corresponding to the sequence to be detected is input into the fault prediction model to obtain the second prediction result, the fault prediction model may further be updated based on the feature set of the sequence to be detected and the second prediction result. In this case, the method for generating a fault prediction model that is provided in this application may further include step S505.

Step S505. Update the fault prediction model based on the feature set of the sequence to be detected and the second prediction result.

After inputting the feature set corresponding to the sequence to be detected into the fault prediction model to obtain the second prediction result, the analyzer may use the second prediction result and the feature set corresponding to the sequence to be detected as an input of the fault prediction model such that the fault prediction model learns the input and an output, to complete update of the fault prediction model, and a prediction result of the fault prediction model is more accurate.

Sequence numbers in the foregoing methods in FIG. 3 to FIG. 6 do not mean execution sequences. The execution sequences of the processes should be determined based on functions and internal logic of the processes, and should not be construed as any limitation on the implementation processes of the embodiments of this application. The foregoing methods may further be combined to provide more implementations. Other implementations obtained by any combination of the foregoing methods should all be considered as falling within the protection scope of this application.

Figure 6:
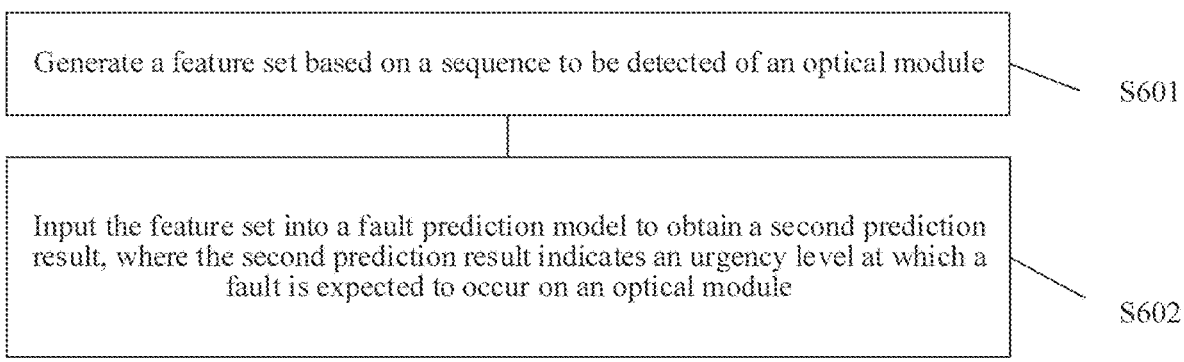
FIG. 6 is a schematic flowchart of a method for determining an urgency level at which a fault might occurs on an optical module according to an embodiment of this application.

The method for predicting a fault of an optical module that is provided in the embodiments of this application is described in detail above with reference to FIG. 1 and FIG. 6. An apparatus for predicting a fault of an optical module that is provided in the embodiments of this application is described in detail below with reference to FIG. 7 and FIG. 8.

Figure 7:
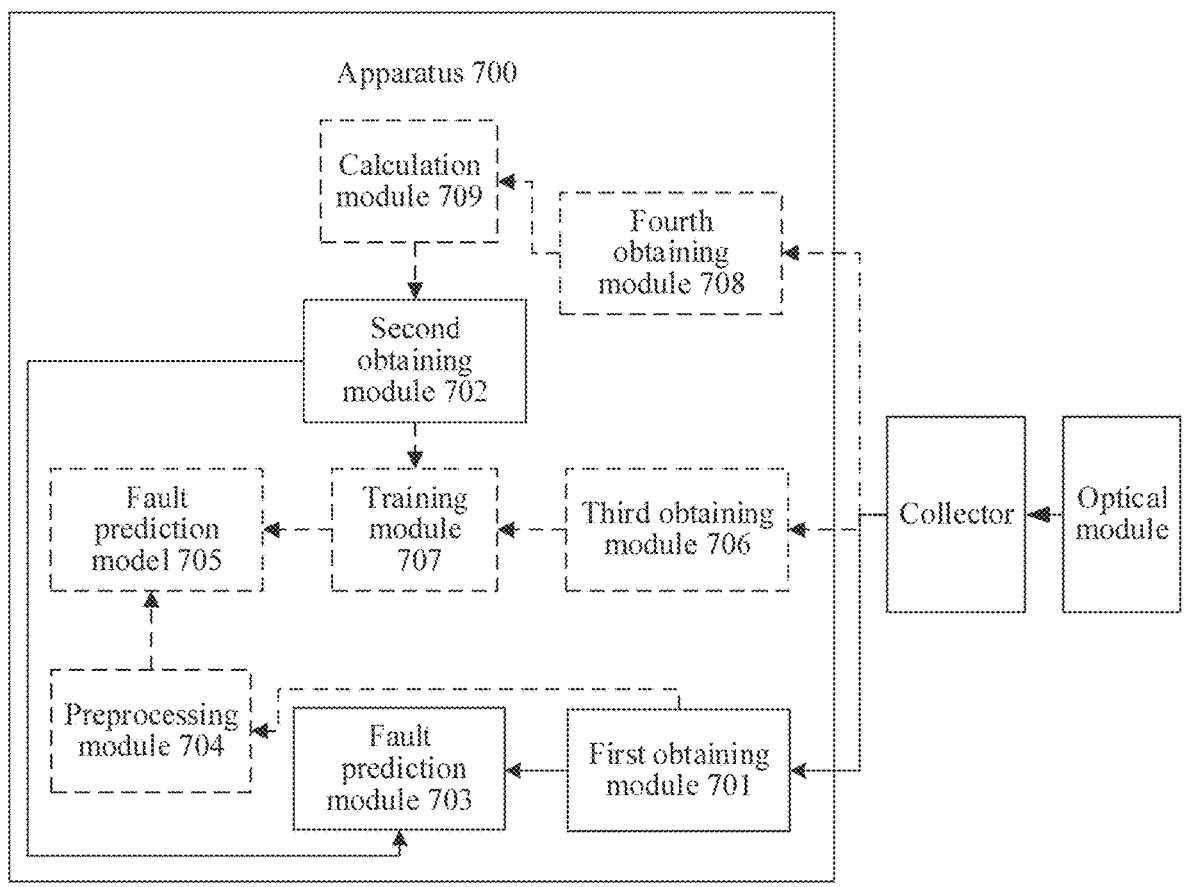
FIG. 7 is a schematic block diagram of an apparatus for predicting a fault of an optical module according to an embodiment of this application.

FIG. 7 is a schematic block diagram of an apparatus 700 for predicting a fault of an optical module according to this application. The apparatus 700 includes a first obtaining module 701 configured to obtain a sequence to be detected of the optical module in a preset time period, where the sequence to be detected includes a plurality of measured values of an operating parameter of the optical module, a second obtaining module 702 configured to obtain a classification threshold corresponding to the operating parameter, where the classification threshold is generated based on a classification sample set corresponding to the operating parameter, and a fault prediction module 703 configured to determine a first prediction result of the optical module based on comparison results between the classification threshold corresponding to the operating parameter and the plurality of measured values in the sequence to be detected, where the first prediction result indicates whether the optical module enters a faulty mode.

Optionally, the apparatus 700 further includes a preprocessing module 704 and a fault prediction model 705.

The preprocessing module 704 is configured to generate a feature set based on the sequence to be detected when the first prediction result indicates that the optical module enters the faulty mode, and input the feature set into the fault prediction model 705.

The fault prediction model 705 is configured to obtain a second prediction result based on the feature set, where the second prediction result indicates an urgency level at which a fault is expected to occur on the optical module.

Optionally, the apparatus 700 further includes a third obtaining module 706 configured to obtain a sample sequence corresponding to the operating parameter, and a training module 707 configured to determine a tag of the sample sequence based on the classification threshold and the sample sequence, where the tag indicates whether the optical module corresponding to the sample sequence is a normal optical module, or the tag indicates an urgency level at which a fault occurs on the optical module corresponding to the sample sequence, generate a fault prediction sample corresponding to the sample sequence, where the fault prediction sample includes a feature set of the sample sequence and the tag of the sample sequence, and generate the fault prediction model based on the fault prediction sample.

Optionally, the training module 707 is further configured to update the fault prediction model based on the feature set of the sequence to be detected and the second prediction result.

Optionally, the apparatus 700 further includes a fourth obtaining module 708 and a calculation module 709.

The fourth obtaining module 708 is configured to obtain the classification sample set corresponding to the operating parameter, where the classification sample set includes a plurality of classification samples, and each classification sample includes one measured value of the operating parameter and one first classification identifier.

The calculation module 709 is configured to determine, based on the classification sample set, the classification threshold corresponding to the operating parameter.

Optionally, the calculation module 709 is further configured to determine a plurality of loss values based on the classification sample set and a plurality of reference classification thresholds, where each loss value corresponds to one reference classification threshold, and the plurality of reference classification thresholds are preset, or the plurality of reference classification thresholds are determined based on the measured value of each classification sample in the classification sample set, determine a reference classification threshold corresponding to a smallest loss value in the plurality of loss values as a classification threshold corresponding to the classification sample set, and determine, based on the classification threshold corresponding to the classification sample set, the classification threshold corresponding to the operating parameter.

Optionally, the calculation module 709 is further configured to reclassify the classification samples in the classification sample set based on each of the plurality of reference classification thresholds, and determine a second classification identifier of each classification sample in the classification sample set based on a classification result, and determine, based on the following loss function and the second classification identifier and the first classification identifier of each classification sample, a loss value corresponding to the reference classification threshold:

$$\text{loss} = \frac{1}{N}\sum_{q=1}^{N}(O_q - P_q)^2,$$

where loss represents a mean square error of all the first classification identifiers in the classification sample set and the corresponding second classification identifiers, N is a quantity of classification samples in the classification sample set, N is greater than or equal to 2, $O_q$ is a first classification identifier of a classification sample whose index value is q in the N classification samples, and $P_q$ is a second classification identifier of the classification sample whose index value is q.

Optionally, the classification sample set includes R positive samples and S negative samples, and the calculation module 709 is further configured to reclassify the classification samples in the classification sample set based on each of the plurality of reference classification thresholds, and determine a second classification identifier of each classification sample in the classification sample set based on a classification result, and determine, based on the following loss function and the second classification identifier and the first classification identifier of each classification sample, a loss value corresponding to the reference classification threshold:

$$loss = c \times loss_f + loss_n,$$

where $loss_f = \frac{1}{R}\sum_{a=1}^{R}(O_a - P_a)^2$, and $$loss_n = \frac{1}{S}\sum_{b=1}^{S}(O_b - P_b)^2,$$

where loss represents a mean square error of all the first classification identifiers in the classification sample set and the corresponding second classification identifiers, $loss_f$ represents a mean square error of first classification identifiers in all the positive samples and corresponding second classification identifier, $loss_n$ represents a mean square error of first classification identifiers in all the negative samples and corresponding second classification identifiers, R is greater than or equal to 2, $O_a$ is a first classification identifier of a positive sample whose index value is a, $P_a$ is a second classification identifier of the positive sample whose index value is a, S is greater than or equal to 2, $O_b$ is a first classification identifier of a negative sample whose index value is b, $P_b$ is a second classification identifier of the negative sample whose index value is b, c is a weight coefficient, and c is greater than or equal to 1.

Optionally, the operating parameter corresponds to M classification sample sets, and the calculation module 709 is further configured to determine M classification thresholds corresponding to the M classification sample sets, and determine, based on the following function, the classification threshold corresponding to the operating parameter:

$$thresh_{final} = \frac{1}{M}\sum_{i=1}^{M}thresh_i,$$

where $thresh_{final}$ is the classification threshold corresponding to the operating parameter, $thresh_i$ is a classification threshold corresponding to an $i^{th}$ classification sample set, and M is greater than 1.

Optionally, the operating parameter is a bias current, the classification threshold is a bias current classification threshold, the sample sequence is a sample sequence of the bias current, and the training module 707 is further configured to if the sample sequence includes at least one measured value that is greater than or equal to the bias current classification threshold, determine the tag of the sample sequence based on a time interval between a collection end moment of the sample sequence and a moment at which a fault occurs on the optical module corresponding to the sample sequence, where the tag indicates the urgency level at which a fault occurs on the optical module corresponding to the sample sequence, or if all measured values in the sample sequence are less than the bias current classification threshold, determine the tag of the sample sequence, where the tag indicates that the optical module corresponding to the sample sequence is a normal optical module.

Optionally, the operating parameter is a receive power, the classification threshold is a receive power classification threshold, the sample sequence is a sample sequence of the receive power, and the training module 707 is further configured to if the sample sequence includes at least one measured value that is less than or equal to the receive power classification threshold, determine the tag of the sample sequence based on a time interval between a collection end moment of the sample sequence and a moment at which a fault occurs on the optical module corresponding to the sample sequence, where the tag indicates the urgency level at which a fault occurs on the optical module corresponding to the sample sequence, or if all measured values in the sample sequence are greater than the receive power classification threshold, determine the tag of the sample sequence, where the tag indicates that the optical module corresponding to the sample sequence is a normal optical module.

Optionally, the feature set includes a feature set corresponding to a bias current and a feature set corresponding to a receive power.

The preprocessing module 704 is further configured to input the feature set corresponding to the bias current and the feature set corresponding to the receive power into the fault prediction model.

The fault prediction model 705 is further configured to obtain a third prediction result corresponding to the bias current and a fourth prediction result corresponding to the receive power, and obtain the second prediction result based on the third prediction result and the fourth prediction result.

As shown in FIG. 7, the first obtaining module 701 obtains the sequence to be detected using a collector, the second obtaining module 702 obtains, from the calculation module 709, the classification threshold that corresponds to the operating parameter and that is determined by the calculation module 709, the third obtaining module 706 obtains the sample sequence corresponding to the operating parameter using the collector, and the fourth obtaining module 708 obtains the classification sample set corresponding to the operating parameter using the collector.

It should be understood that in an actual application, the first obtaining module 701, the third obtaining module 706, and the fourth obtaining module 708 may be a same obtaining module, or the first obtaining module 701, the second obtaining module 702, the third obtaining module 706, and the fourth obtaining module 708 may be a same obtaining module. This is not limited in this embodiment of this application.

It should be understood that the apparatus 700 in this application may be implemented using an application-specific integrated circuit (ASIC), or a programmable logic device (PLD). The PLD may be a complex PLD (CPLD), a field-programmable gate array (FPGA), generic array logic (GAL), or any combination thereof. The method for predicting a fault of an optical module that is shown in FIG. 3 to FIG. 6 may alternatively be implemented using software. The apparatus 700 and the modules of the apparatus 700 may be software modules when the method for predicting a fault of an optical module that is shown in FIG. 3 to FIG. 6 is implemented using software.

The apparatus 700 according to this embodiment of this application may correspondingly perform the method described in this application, and the foregoing and other operations and/or functions of all the units in the apparatus 700 are used to implement corresponding procedures that are performed by the analyzer or the controller in the method for predicting a fault of an optical module that is shown in FIG. 3 to FIG. 6. For brevity, details are not described herein again.

It should be understood that the collector in FIG. 7 is independent of the apparatus 700, located outside the apparatus 700, and connected to the apparatus 700. Alternatively, the collector may be located inside the apparatus 700, that is, the collector may alternatively be a part of the apparatus 700. This is not limited in this embodiment of this application.

Figure 8:
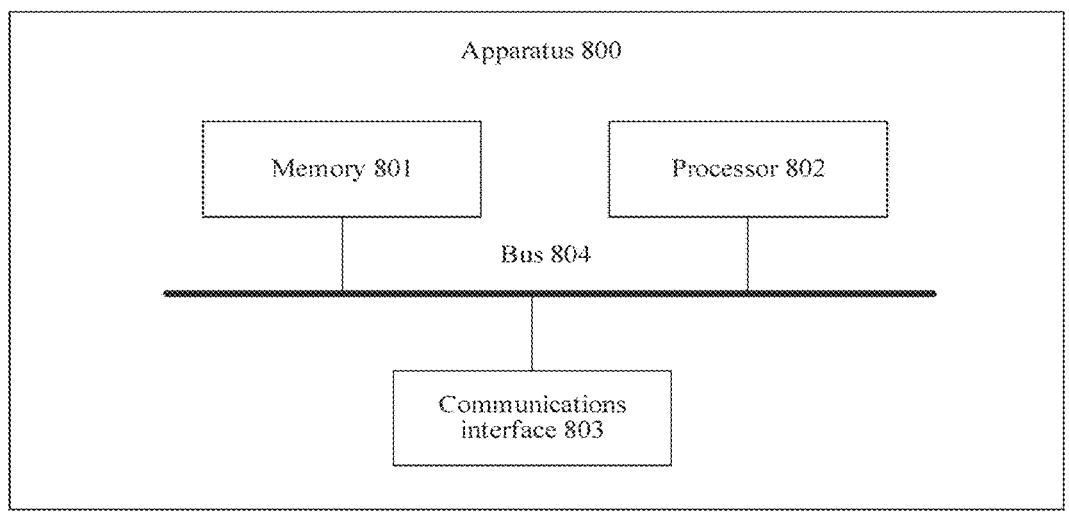
FIG. 8 is another schematic block diagram of an apparatus for predicting a fault of an optical module according to an embodiment of this application.

FIG. 8 is a schematic structural diagram of hardware of an apparatus 800 for predicting a fault of an optical module according to an embodiment of this application. The apparatus 800 (the apparatus 800 may be a computing device) for predicting a fault of an optical module that is shown in FIG. 8 includes a memory 801, a processor 802, a communications interface 803, and a bus 804. The memory 801, the processor 802, and the communications interface 803 implement communication connection between each other through the bus 804.

The memory 801 may be a read-only memory (ROM), a static storage device, a dynamic storage device, or a random-access memory (RAM). The memory 801 may store a program, and when the program stored in the memory 801 is executed by the processor 802, the processor 802 and the communications interface 803 are configured to perform the steps in the method for predicting a fault of an optical module in the embodiments of this application.

The processor 802 may be a general purpose central processing unit (CPU), a microprocessor, an ASIC, a graphics processing unit (GPU), or one or more integrated circuits, and is configured to execute a related program in order to implement functions that the units in the apparatus for predicting a fault of an optical module need to perform in the embodiments of this application, or is configured to perform the method for predicting a fault of an optical module in the embodiments of this application.

The processor 802 may alternatively be an integrated circuit chip and has a signal processing capability. In an implementation process, the steps in the method for predicting a fault of an optical module in this application may be implemented using an integrated logic circuit in hardware form or an instruction in a software form in the processor 802. The processor 802 may alternatively be a general purpose processor, a digital signal processor (DSP), an ASIC, an FPGA or another programmable logical device, a discrete gate or transistor logic device, or a discrete hardware component, and may implement or perform the methods, the steps, and logical block diagrams that are disclosed in the embodiments of this application. The general purpose processor may be a microprocessor or any conventional processor. The steps in the method disclosed in the embodiments of this application may be implemented by a hardware decoding processor, or by a combination of hardware and a software module in the decoding processor. The software module may be located in a mature storage medium in the art, such as a RAM, a flash memory, a ROM, a programmable ROM (PROM), an electrically erasable PROM (EEPROM), or a register. The storage medium is located in the memory 801, the processor 802 reads information in the memory 801, and may complete, in combination with hardware in the processor 802, functions that the units included in the apparatus for predicting a fault of an optical module in the embodiments of this application need to perform, or perform the method for predicting a fault of an optical module in the embodiments of this application.

The communications interface 803 uses, for example but not limited to, a transceiver apparatus of a transceiver type to implement communication between the apparatus 800 and another device or a communications network. For example, a sample sequence corresponding to an operating parameter and a classification sample set corresponding to the operating parameter may be obtained through the communications interface 803.

The bus 804 may include a channel on which information is transmitted between the components (for example, the memory 801, the processor 802, and the communications interface 803) of the apparatus 800.

It should be noted that although the apparatus 800 shown in FIG. 8 only shows the memory, the processor, and the communications interface, in a specific implementation process, a person skilled in the art should understand that the apparatus 800 further includes other components that are necessary to implement normal running. In addition, based on a specific requirement, a person skilled in the art should understand that the apparatus 800 may further include hardware components for implementing other additional functions. In addition, a person skilled in the art should understand that the apparatus 800 may only include components that are necessary to implement the embodiments of this application, but does not need to include all the components shown in FIG. 8.

It should be understood that the apparatus 800 is equivalent to the analyzer in the embodiments of this application. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

An embodiment of this application further provides a computer-readable storage medium, the computer-readable storage medium includes a computer program, and when the computer program is run on a computer, the computer is enabled to perform the method provided in the foregoing method embodiments.

An embodiment of this application further provides a computer program product that includes an instruction, and when the computer program product is run on a computer, the computer is enabled to perform the method provided in the foregoing method embodiments.

An embodiment of this application further provides a system. The system includes a collector, an apparatus for predicting a fault of an optical module, and an optical module. The collector is configured to collect measured values of an operating parameter related to the optical module, and sends the collected measured values to the apparatus for predicting a fault of an optical module. The measured values of the operating parameter related to the optical module may include a sequence to be detected of the optical module in a preset time period, a sample sequence corresponding to the operating parameter, and the like. The apparatus for predicting a fault of an optical module is configured to receive the measured values of the operating parameter related to the optical module that are sent by the collector, and perform the method in any one of FIG. 3 to FIG. 6 based on the measured values.

The apparatus for predicting a fault of an optical module may be the analyzer shown in FIG. 1, the apparatus 700 shown in FIG. 7, or the apparatus 800 shown in FIG. 8.

The foregoing uses an example in which the system includes one optical module. In actual deployment, the system may include a plurality of optical modules, and the collector needs to collect measured values of an operating parameter related to each optical module.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for predicting a fault of an optical module and comprising:
   obtaining a first sequence of the optical module, wherein the first sequence comprises a plurality of measured values of an operating parameter of the optical module;
   obtaining a classification threshold corresponding to the operating parameter;
   comparing the measured values and the classification threshold to produce comparison results; and
   determining a first prediction result of the optical module based on the comparison results,
   wherein the first prediction result indicates whether the optical module has entered a faulty mode,
   wherein when the first prediction result indicates that the optical module has entered the faulty mode, the method further comprises:
      generating a first feature set based on the first sequence; and
      inputting the first feature set into a fault prediction model to obtain a second prediction result, and
      wherein the second rediction result indicates an urgency level at which the fault is expected to occur on the optical module.

2. The method of claim 1, further comprising:
   obtaining a sample sequence corresponding to the operating parameter;
   determining a tag of the sample sequence based on the classification threshold and the sample sequence, wherein either the tag indicates whether the optical module corresponding to the sample sequence is a non-faulty optical module, or the tag indicates the urgency level at which the fault occurs on the optical module corresponding to the sample sequence;
   generating a fault prediction sample corresponding to the sample sequence, wherein the fault prediction sample comprises a second feature set of the sample sequence and the tag of the sample sequence; and
   generating the fault prediction model based on the fault prediction sample.

3. The method of claim 2, further comprising updating the fault prediction model based on the first feature set and the second prediction result.

4. The method of claim 1, wherein the classification threshold is based on a classification sample set corresponding to the operating parameter, wherein the classification sample set comprises a plurality of classification samples, wherein each of the classification samples comprises one measured value of the operating parameter and one first classification identifier; and wherein before obtaining the classification threshold corresponding to the operating parameter, the method further comprises determining, based on the classification sample set, the classification threshold corresponding to the operating parameter.

5. The method of claim 4, further comprising:
   determining a plurality of loss values based on the classification sample set and a plurality of reference classification thresholds, wherein each loss value corresponds to one reference classification threshold, and wherein the reference classification thresholds are either preset or based on the measured value of each of the classification samples;
   determining a reference classification threshold corresponding to a smallest loss value in the loss values as a classification threshold corresponding to the classification sample set; and
   determining, based on the classification threshold corresponding to the classification sample set, the classification threshold corresponding to the operating parameter.

6. The method of claim 5, further comprising:
   reclassifying the classification samples in the classification sample set based on each of the reference classification thresholds;

determining a second classification identifier of each classification sample in the classification sample set based on a classification result; and determining, based on a loss function and the first classification identifier and the second classification identifier of each classification sample, a loss value corresponding to the reference classification threshold, wherein the loss function comprises:

$$loss = \frac{1}{N}\sum_{q=1}^{N}(O_q - P_q)^2,$$

wherein loss represents a mean square error of all the first classification identifiers in the classification sample set and the second classification identifiers, wherein N is a quantity of classification samples in the classification sample set, wherein N is greater than or equal to two, wherein $O_q$ is a first classification identifier of a classification sample whose index value is q in the N classification samples, and wherein $P_q$ is a second classification identifier of the classification sample whose index value is q.

7. The method of claim 5, wherein the classification sample set comprises R positive samples and S negative samples, and wherein the method further comprises:

reclassifying the classification samples in the classification sample set based on each of the plurality of reference classification thresholds;

determining a second classification identifier of each classification sample in the classification sample set based on a classification result; and determining, based on a loss function and the first classification identifier and the second classification identifier of each classification sample, a loss value corresponding to the reference classification threshold, wherein the loss function is calculated according to the equations:

$$loss = c \times loss_f + loss_n,$$

$$loss_f = \frac{1}{R}\sum_{a=1}^{R}(O_a - P_a)^2, \text{ and}$$

$$loss_n = \frac{1}{S}\sum_{b=1}^{S}(O_b - P_b)^2,$$

wherein loss represents a mean square error of all the first classification identifiers in the classification sample set and the second classification identifiers, wherein $loss_f$ represents a mean square error of first classification identifiers in all the positive samples and corresponding second classification identifiers, wherein $loss_n$ represents a mean square error of first classification identifiers in all the negative samples and corresponding second classification identifiers, wherein R is greater than or equal to two, wherein $O_a$ is a first classification identifier of a positive sample whose index value is a, wherein $P_a$ is a second classification identifier of the positive sample whose index value is a, wherein S is greater than or equal to two, wherein $O_b$ is a first classification identifier of a negative sample whose index value is b, wherein $P_b$ is a second classification identifier of the negative sample whose index value is b, wherein c is a weight coefficient, and wherein c is greater than or equal to one.

8. The method of claim 5, wherein the operating parameter corresponds to M classification sample sets, and wherein the method further comprises:

determining M classification thresholds corresponding to the M classification sample sets; and determining, based on a function, the classification threshold corresponding to the operating parameter, wherein the function comprises:

$$thresh_{final} = \frac{1}{M}\sum_{i=1}^{M}thresh_i,$$

wherein $thresh_{final}$ is the classification threshold corresponding to the operating parameter, wherein $thresh_i$ is a classification threshold corresponding to an $i^{th}$ classification sample set, and wherein M is greater than one.

9. The method of claim 2, wherein when the operating parameter is a bias current, the classification threshold is a bias current classification threshold, and the sample sequence is a sample sequence of the bias current, the method further comprises:

determining the tag of the sample sequence based on a time interval between a collection end moment of the sample sequence and a moment at which a fault occurs on the optical module corresponding to the sample sequence when the sample sequence comprises at least one measured value that is greater than or equal to the bias current classification threshold, wherein the tag indicates the urgency level at which the fault occurs on the optical module corresponding to the sample sequence; or determining the tag of the sample sequence when all measured values in the sample sequence are less than the bias current classification threshold, wherein the tag indicates that the optical module corresponding to the sample sequence is a non-faulty optical module.

10. The method of claim 2, wherein when the operating parameter is a receive power, the classification threshold is a receive power classification threshold, and the sample sequence is a sample sequence of the receive power, the method further comprises:

determining the tag of the sample sequence based on a time interval between a collection end moment of the sample sequence and a moment at which a fault occurs on the optical module corresponding to the sample sequence when the sample sequence comprises at least one measured value that is less than or equal to the receive power classification threshold, wherein the tag indicates the urgency level at which the fault occurs on the optical module corresponding to the sample sequence; or determining the tag of the sample sequence when all measured values in the sample sequence are greater than the receive power classification threshold, wherein the tag indicates that the optical module corresponding to the sample sequence is a non-faulty optical module.

11. The method of claim 1, wherein the first feature set comprises a bias current feature set and a receive power feature set, and wherein the method further comprises:

inputting the bias current feature set and the receive power feature set into the fault prediction model to obtain a third prediction result corresponding to bias current and a fourth prediction result corresponding to a receive power; and determining the second prediction result based on the third prediction result and the fourth prediction result.

12. An apparatus for predicting a fault of an optical module and comprising:
   a memory configured to store a program; and
   a processor coupled to the memory and configured to execute the program to cause the apparatus to:
      obtain a first sequence of the optical module, wherein the first sequence comprises a plurality of measured values of an operating parameter of the optical module;
      obtain a classification threshold corresponding to the operating parameter;
      compare the measured values and the classification threshold to produce comparison results; and
      determine a first prediction result of the optical module based on the comparison results,
      wherein the first prediction result indicates whether the optical module enters a faulty mode,
      wherein when the first prediction result indicates that the optical module has entered the faulty mode the processor is further configured to execute the program to cause the apparatus to:
         generate a first feature set based on the first sequence when the first prediction result indicates that the optical module enters the faulty mode; and
         input the first feature set into the fault prediction model to obtain a second prediction result based on the first feature set, and
         wherein the second prediction result indicates an urgency level at which the fault is expected to occur on the optical module.

13. The apparatus of claim 12, wherein the processor is further configured to execute the program to cause the apparatus to:
   obtain a sample sequence corresponding to the operating parameter;
   determine a tag of the sample sequence based on the classification threshold and the sample sequence, wherein either the tag indicates whether the optical module corresponding to the sample sequence is a non-faulty optical module, or the tag indicates an urgency level at which the fault occurs on the optical module corresponding to the sample sequence;
   generate a fault prediction sample corresponding to the sample sequence, wherein the fault prediction sample comprises a second feature set of the sample sequence and the tag of the sample sequence; and
   generate the fault prediction model based on the fault prediction sample.

14. The apparatus of claim 13, wherein the processor is further configured to execute the program to cause the apparatus to update the fault prediction model based on the first feature set and the second prediction result.

15. The apparatus of claim 12, wherein the classification threshold is generated based on a classification sample set corresponding to the operating parameter, and wherein the processor is further configured to execute the program to cause the apparatus to:
   obtain the classification sample set corresponding to the operating parameter, wherein the classification sample set comprises a plurality of classification samples, and wherein each classification sample comprises one measured value of the operating parameter and a first classification identifier; and
   determine, based on the classification sample set, the classification threshold corresponding to the operating parameter.

16. The apparatus of claim 15, wherein the processor is further configured to execute the program to cause the apparatus to:
   determine a plurality of loss values based on the classification sample set and a plurality of reference classification thresholds, wherein each loss value corresponds to one reference classification threshold, and wherein the reference classification thresholds are either preset or are determined based on the measured value of each classification sample in the classification sample set;
   determine a reference classification threshold corresponding to a smallest loss value in the loss values as a classification threshold corresponding to the classification sample set; and
   determine, based on the classification threshold corresponding to the classification sample set, the classification threshold corresponding to the operating parameter.

17. The apparatus of claim 13, wherein when the operating parameter is a bias current, the classification threshold is a bias current classification threshold, and the sample sequence is a sample sequence of the bias current, the processor is further configured to execute the program to cause the apparatus to:
   determine the tag of the sample sequence based on a time interval between a collection end moment of the sample sequence and a moment at which a fault occurs on the optical module corresponding to the sample sequence when the sample sequence comprises at least one measured value that is greater than or equal to the bias current classification threshold, wherein the tag indicates the urgency level at which the fault occurs on the optical module corresponding to the sample sequence; or
   determine the tag of the sample sequence when all measured values in the sample sequence are less than the bias current classification threshold, wherein the tag indicates that the optical module corresponding to the sample sequence is a non-faulty optical module.

18. The apparatus of claim 13, wherein when the operating parameter is a receive power, the classification threshold is a receive power classification threshold, and the sample sequence is a sample sequence of the receive power, the processor is further configured to execute the program to cause the apparatus to:
   determine the tag of the sample sequence based on a time interval between a collection end moment of the sample sequence and a moment at which a fault occurs on the optical module corresponding to the sample sequence when the sample sequence comprises at least one measured value that is less than or equal to the receive power classification threshold, wherein the tag indicates the urgency level at which the fault occurs on the optical module corresponding to the sample sequence; or
   determine the tag of the sample sequence when all measured values in the sample sequence are greater than the receive power classification threshold, wherein the tag indicates that the optical module corresponding to the sample sequence is a non-faulty optical module.

19. The apparatus of claim 12, wherein the first feature set comprises a bias current feature set and a receive power feature set, and wherein the processor is further configured to execute the program to cause the apparatus to:
- input the bias current feature set and the receive power feature set into the fault prediction model to obtain a third prediction result corresponding to bias current and a fourth prediction result corresponding to a receive power; and
- determine the second prediction result based on the third prediction result and the fourth prediction result.

20. The apparatus of claim 16, wherein the processor is further configured to execute the program to cause the apparatus to:
- reclassify the classification samples in the classification sample set based on each of the reference classification thresholds;
- determine a second classification identifier of each classification sample in the classification sample set based on a classification result; and
- determine, based on a loss function and the first classification identifier and the second classification identifier of each classification sample, a loss value corresponding to the reference classification threshold, wherein the loss function comprises:

$$\text{loss} = \frac{1}{N} \sum_{q=1}^{N} (O_q - P_q)^2,$$

wherein loss represents a mean square error of all the first classification identifiers in the classification sample set and the second classification identifiers, wherein N is a quantity of classification samples in the classification sample set, wherein N is greater than or equal to two, wherein $O_q$ is a first classification identifier of a classification sample whose index value is q in the N classification samples, and wherein $P_q$ is a second classification identifier of the classification sample whose index value is q.

* * * * *

UNITED STATES PATENT AND TRADEMARK OFFICE
CERTIFICATE OF CORRECTION

| | |
|---|---|
| PATENT NO. | : 11,265,081 B2 |
| APPLICATION NO. | : 17/166601 |
| DATED | : March 1, 2022 |
| INVENTOR(S) | : Fangfang Yu et al. |

It is certified that error appears in the above-identified patent and that said Letters Patent is hereby corrected as shown below:

In the Claims

Claim 1, Column 28, Line 14: "second rediction result" should read "second prediction result"

Signed and Sealed this
Seventeenth Day of May, 2022

*Katherine Kelly Vidal*

Katherine Kelly Vidal
*Director of the United States Patent and Trademark Office*